Nov. 16, 1937.　　　G. LARSEN　　　2,099,126
METHOD OF FORMING TUBES
Filed April 27, 1935　　　2 Sheets-Sheet 1

INVENTOR.
Gabriel Larsen,
BY
Gifford, Scull & Burgess.
ATTORNEYS.

Nov. 16, 1937.    G. LARSEN    2,099,126
METHOD OF FORMING TUBES
Filed April 27, 1935    2 Sheets-Sheet 2

INVENTOR.
Gabriel Larsen,
BY
Gifford, Scull & Burgess.
ATTORNEYS

Patented Nov. 16, 1937

2,099,126

UNITED STATES PATENT OFFICE 2,099,126

METHOD OF FORMING TUBES

Gabriel Larsen, Springfield, N. J., assignor to L. E. Waterman Company, New York, N. Y., a corporation of New York Application April 27, 1935, Serial No. 18,701

3 Claims. (Cl. 41—35)

This invention relates to a novel and improved form of method of forming tubes, the novel features of which will be best understood from the following description and the annexed drawings, in which I have shown a selected embodiment of the invention and in which:

Fig. 1 is a cross-sectional view of a rod which may form the raw material upon which the method is practiced;

Figs. 2, 3, and 4 are views showing consecutive steps in the treatment of the rod shown in Fig. 1, Fig. 4 showing the finished tube;

The raw material is a body which may conveniently be in the form of a rod or tube. For the sake of convenience, I have shown both the rod and tube as of cylindrical cross-section, but it will be understood that that is done merely for the sake of convenience of illustration, since the shape of the body may vary widely.

Similarly, the material of which the body is formed may be of any material of which it is desired the finished product shall consist. For the purpose of illustration, I shall assume that the body is made of a translucent or transparent cellulosic material and that the finished tube is to be used for making a fountain pen barrel.

According to my invention, I replace certain parts of the translucent body with relatively opaque parts. While I shall thus refer to the body as translucent and the other parts as opaque, it is of course to be understood that that relation may be reversed and that the invention in fact is not limited to the use of translucent or opaque materials, since it may be practiced equally well with other materials which are contrasting in appearance, in color, or in other respects.

It is oftentimes desirable to make fountain pen barrels with various designs for decorative purposes and sometimes it is desirable to combine the decorative effect with a barrel which is sufficiently translucent so that the level of ink therein can be readily ascertained by inspection. My invention readily lends itself to the making of a barrel which shall have all or only selected ones of the above characteristics.

Figures 1, 2, 3:
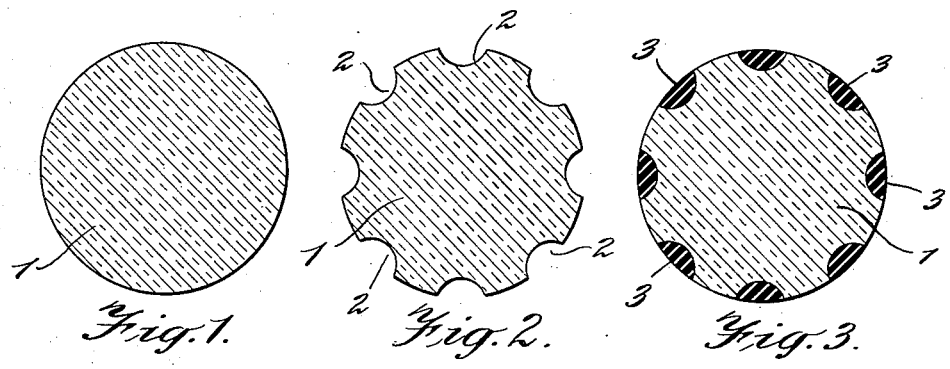

Referring now to Figs. 1 to 6, inclusive, and assuming that the tube made according to the present invention is to be used for a fountain pen barrel having certain areas translucent and certain areas relatively opaque, I may form the translucent rod 1 of Fig. 1 with a plurality of recesses on the outer surface thereof. These recesses may take any desirable form, but for the purposes of illustration I have shown them as in the form of grooves 2 which are milled or otherwise formed in the surface of the rod and extend substantially coaxially thereof. These grooves are shown as being equally spaced around the periphery of the rod, although it will be understood that this spacing may be varied as found desirable.

After the grooves are formed, I place therein pieces 3 of material which is opaque as compared to the material of which the rod 1 is made. Assuming, as I have, that the rod 1 is of cellulosic material, the pieces 3 may conveniently be made of the same material and integrally secured to the material of the rod by any of the means known in the handling of this type of material. For example, a suitable acetone cement may be used to unite the rod with the pieces, preferably with pressure. This method of forming an integral connection between the piece and rod is merely given as an example of one well-known method.

The pieces 3 may be fully formed in strips when the recesses are in the form of grooves, and one convenient way of obtaining the strips of the desired shape and size is to remove the strips from another rod of substantially identical diameter and cross-section as the rod 1, but of the desired different material. A similar method is more fully described in connection with the embodiments shown in Figs. 7 to 14.

After the rod and strips are united to form the structure appearing in Fig. 3, it will be seen that the appearance of the rod is of alternate opaque and translucent stripes. For some purposes, a rod as thus constituted may be found useful, but assuming that it is desired to form a tube, such tube may now be formed by boring out the central portion of the rod to form the wall 4 as in Fig. 4. In this particular figure, the size of the bore is sufficient so that the inner surface 5 of the wall 4 is tangent with the cylindrical walls 6 of the grooves 2. Since the strips 3 are integrally united with the material of the rod, the entire combined rod and strips may be treated as a single piece so that the size of the bore may extend to the strips 3 as shown in Fig. 4 or even into those strips if desired.

Figures 4, 5:
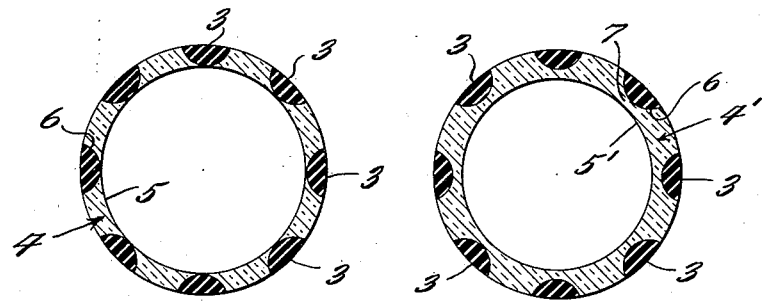
Fig. 5 is a view similar to Fig. 4, but showing a different embodiment of the product achieved by a slightly different step in the method of Figs. 1, 2, 3, and 4.

On the other hand, the bore may be made smaller as shown in Fig. 5, so that the wall 4' will comprise a portion 7 between the inner surface 5' of the wall 4' and the walls 6 of the grooves.

Figure 6:
Fig. 6 is a view of the product of either Figs. 4 or 5, viewed lengthwise of the tube.
Figure 7:
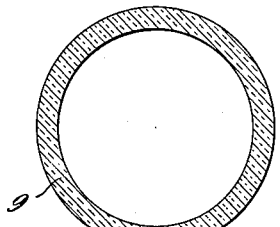
Fig. 7 is a cross-sectional view of a tube which likewise may form the raw material upon which the method is practiced.

The finished tube will have some such appearance as indicated in Fig. 6, with alternate opaque and translucent stripes, the opaque stripes being formed by the strips 3 and the translucent stripes being formed by the portions 8 between the strips.

Referring now to Figs. 7 to 14, inclusive, I have shown therein a method which may be practiced where the raw material is in the form of a tube 9, which is here illustrated as of translucent material. In the wall of this tube may be formed a plurality of recesses, here shown as being arranged in groups of three about the periphery of the tube, although this arrangement is a purely arbitrary one.

Figure 8:
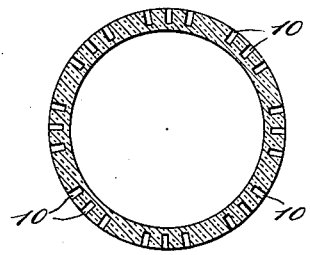
Fig. 8 is a view similar to Fig. 7 but showing a later step in the method of treating the tube of Fig. 7.
Figure 9:
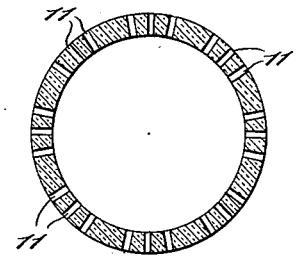
Fig. 9 is a view similar to Fig. 8 but showing a different form which may be achieved as a result of the first step.
Figure 10:
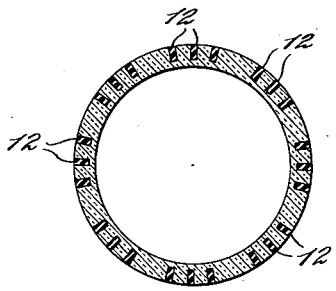
Figs. 10 and 11 are views corresponding respectively to Figs. 8 and 9 and showing the completed article.
Figure 14:
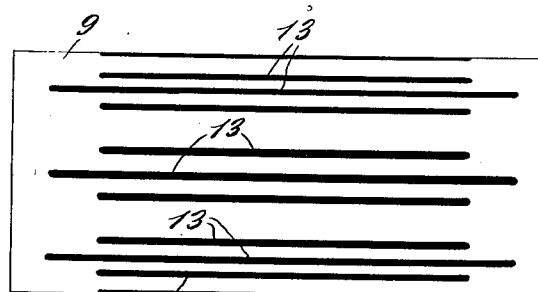
Fig. 14 is a longitudinal view of a portion of the tube shown in Fig. 10 or Fig. 11.

The recesses may be in the form of the grooves 10, as shown in Fig. 8, or in the form of slots 11 extending entirely through the wall, as shown in Fig. 9. Where the recesses extend completely through the wall as in Fig. 9, it will be understood that they are not continuous, but may have some such arrangement as shown in Fig. 14.

The recesses may next be filled with pieces 12 or 13, as indicated in Figs. 10 and 11, and here again for purpose of illustration I have shown these pieces as being made of relatively opaque material. The pieces are made to fit closely within the recesses and are integrally secured to the walls of those recesses by any suitable means, such, for example, as by the use of acetone cement mentioned above.

Figure 11:
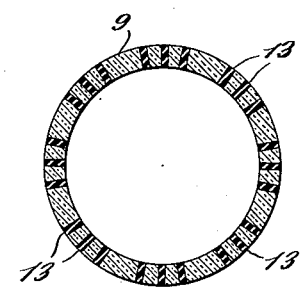
Figure 12:
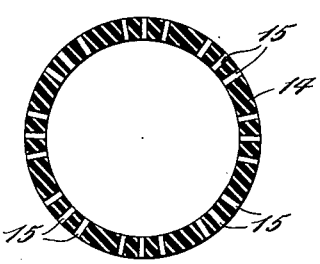
Figs. 12 and 13 are views corresponding respectively to Figs. 9 and 11 and showing a tube which may be used in conjunction with the tube of Fig. 7 in practicing the invention according to this form.
Figure 13:
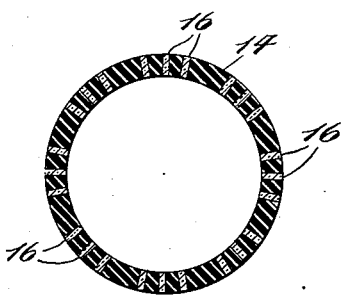

A convenient way of forming the pieces of correct shape is illustrated in Figs. 11, 12, and 13. The tube 14 is made of the opaque material of which it is desired to form the pieces 13. Assuming that those pieces are to be in the form of strips as shown in Fig. 14, I may form the slots 11 and the slots 15 in the two tubes 9 and 14 of identical size and shape and correspondingly located in the tubes. The slots may be formed by removing strips of material from the respective tubes, and then the strips removed from the tube 14 may become the strips 13 inserted in the slots in the tube shown, as indicated in Fig. 11.

Similarly, the strips removed to form the slots 11 may become the strips 16 placed in the slots 15 of the tube 14, as indicated in Fig. 13.

In other words, the pieces removed from the two tubes, being removed from corresponding locations and being identical in size and shape, may be interchanged. On the other hand, if found more convenient for any reason, slots may be formed in one tube, wasting the material thus removed, and then pieces of the desired size and shape may be removed from the second tube and placed in the recesses of the first tube.

As pointed out above, the method just described may be practiced equally well with rods or other forms of bodies as well as with the tubular form of body in connection with which it has been described in detail.

The tube obtained from either of the specific methods described above may be used for any purpose desired, such, for example, as the barrel of a fountain pen. When so used, it will be found that the tube is susceptible of a wide range of decorative effects, dependent upon the character of the materials used, and the locations and arrangement of the recesses and the pieces therein. Normally, the pieces in the recesses will be of different color than that of the body in which the recesses are formed, and it will be understood that the invention is not limited to an arrangement in which various materials are translucent and opaque, respectively.

Various changes in details will suggest themselves to those skilled in the art, and therefore I do not intend to limit myself except by the appended claims.

I claim:
1. The method which comprises forming two tubes of contrasting appearance and of substantially equal diameter, cross-section and wall thickness, forming recesses in the wall of one of said tubes and correspondingly located and substantially identically shaped recesses in the wall of the other tube, and securing in the recesses in one tube the material removed from the other tube in forming the recesses therein.

2. The method which comprises forming two cylindrically shaped bodies of contrasting appearance and of substantially identical cross-section, forming recesses in the cylindrical surface of one of said bodies and correspondingly located and substantially identically shaped recesses in the cylindrical surface of the other body, and securing in the recesses in one body the material removed from the recesses in the other body.

3. The method which comprises forming two tubes of contrasting appearance and of substantially equal diameter, cross-section and wall thickness, removing pieces of material from one of said tubes to form slots extending through the wall thereof, forming correspondingly located and substantially identically shaped slots in the wall of the other tube, and placing said pieces in said last-named slots and securing them to the walls thereof.

GABRIEL LARSEN.